United States Patent [19]
Matsuda et al.

[11] Patent Number: 5,634,338
[45] Date of Patent: Jun. 3, 1997

[54] FLUID PRESSURE CONTROL DEVICE

[75] Inventors: Shohei Matsuda; Kazutoshi Tashima; Yoshihiro Urai; Masaaki Myoi, all of Wako, Japan

[73] Assignee: Honda Giken Kogyo Kabushiki Kaisha, Tokyo, Japan

[21] Appl. No.: 479,584

[22] Filed: Jun. 7, 1995

Related U.S. Application Data

[63] Continuation-in-part of Ser. No. 5,109, Jan. 15, 1993, abandoned.

[30] Foreign Application Priority Data

Jan. 20, 1992 [JP] Japan ................................. 4-007515

[51] Int. Cl.$^6$ ............................................. B60T 13/20
[52] U.S. Cl. ................................. 60/556; 60/591
[58] Field of Search ................................. 60/550, 553, 554, 60/555, 556, 557, 591; 91/415

[56] References Cited

U.S. PATENT DOCUMENTS

| | | | |
|---|---|---|---|
| 4,180,098 | 12/1979 | Budzich | 91/446 |
| 4,312,182 | 1/1982 | Filderman | 60/556 |
| 4,449,369 | 5/1984 | Dauvergne | 60/556 |
| 4,858,737 | 8/1989 | Tourneur et al. | 60/591 |

FOREIGN PATENT DOCUMENTS

| | | |
|---|---|---|
| 2480371 | 4/1980 | France . |
| 1379504 | 3/1988 | U.S.S.R. ........................... 91/415 |

OTHER PUBLICATIONS

Krist, Thomas: Hydraulik, Vogel-Verlag, 1980, S. 40.

*Primary Examiner*—F. Daniel Lopez
*Attorney, Agent, or Firm*—Armstrong Westerman Hattori McLeland & Naughton

[57] ABSTRACT

A fluid pressure control device has a sliding member fitted in a housing for switching over the connection and the disconnection between an input port connected to a fluid pressure supply source, an output port connected to a fluid pressure operated device and a release port connected to a reservoir; a reaction chamber for generating a fluid pressure urging the sliding member in a retracting direction; an urging piston operatively connected to the rear end of the sliding member; an input piston operatively connected to an operation member; and a pressure chamber formed between a back surface of the urging piston and a front surface of the input piston; wherein a first pressure receiving area of the sliding member exposed to the reaction chamber is set smaller than a second pressure receiving area of the urging piston exposed to the pressure chamber, and the second pressure receiving area is set smaller than a third pressure receiving area of the input piston exposed to the pressure chamber. The ratio of the pressure receiving area of the urging piston, exposed to the pressure chamber to the pressure receiving area of the sliding member, exposed to the reaction chamber is greater than a ratio of the pressure receiving area of the input piston, exposed to the pressure chamber of the urging piston, exposed to the pressure chamber (i.e., $A_2/A_1 > A_3/A_2$).

7 Claims, 7 Drawing Sheets

FLUID PRESSURE CONTROL DEVICE

This is a continuation-in-part of application Ser. No. 08/005,109 filed Jan. 15, 1993, abandoned.

BACKGROUND OF THE INVENTION

1. Field of the Invention

The present invention relates to a fluid pressure control device for use, for example, in the braking system of a vehicle, and comprising a housing which has an input port connected to a fluid pressure supply source, an output port leading to a fluid pressure operated device and a release port connected to a reservoir; a sliding member slidably fitted in the housing between a retracted position connecting the output port with the release port and an advanced position connecting the output port with the input port; a reaction chamber in the housing and facing a front surface of the sliding member for generating a fluid pressure urging the sliding member in a retracting direction, the reaction chamber being connected to the output port; an urging piston slidably fitted in the housing and operatively connected to a rear end of the sliding member; an input piston slidably fitted in the housing and operatively connected to an operation member; and a pressure chamber formed between a back surface of the urging piston and a front surface of the input piston.

2. Description of the Prior Art

Such a fluid pressure control device is conventionally known, for example, from Japanese Patent Application Laid-open No. 220054/91.

In the above prior art fluid pressure control device, pressure receiving areas of the urging piston and the input piston, each exposed to the pressure chamber, are set at an equal value. Hence, if the fluid pressure is varied in a condition in which there is such fluid pressure generated in the reaction chamber, the variation in pressure in the pressure chamber, due to the forward and rearward sliding movement of the sliding member, is relatively large, resulting in a relatively large kick-back applied from the input piston to the operation member. In addition, when the operation member is further operated from a condition in which the sliding member cuts off the communication between the output port and the input port, thereby advancing the sliding member, the ratio of the amount of input piston advanced to the amount of urging piston advanced is 1:1. Therefore, a force required to advance the sliding member to a position in which the output port and the input port are put into communication with each other is relatively large.

SUMMARY OF THE INVENTION

Accordingly, it is an object of the present invention to provide a fluid pressure control device in which the kick-back, resulting from the variation in reaction force, can be reduced, and the stroke, resulting from the further operation of the operation member, can be reduced.

To achieve the above object, according to a first aspect and feature of the present invention, there is provided a fluid pressure control device comprising a housing which has an input port connected to a fluid pressure supply source, an output port leading to a fluid pressure operated device and a release port connected to a reservoir. A sliding member is slidably fitted in the housing between a retracted position, at which the sliding member connects the output port with the release port, and an advanced position, at which the sliding member connects the output port with the input port. A reaction chamber is formed in the housing, facing a front surface of the sliding member, for generating a fluid pressure urging the sliding member in a retracting direction. The reaction chamber is connected to the output port. An urging piston is slidably fitted in the housing and operatively connected to a rear end of the sliding member. An input piston is slidably fitted in the housing and operatively connected to an operation member. A pressure chamber is formed between a back surface of the urging piston and a front surface of the input piston. A pressure receiving area of the sliding member, exposed to the reaction chamber, is set smaller than a pressure receiving area of the urging piston, exposed to the pressure chamber, and the pressure receiving area of the urging piston is set smaller than a pressure receiving area of the input piston exposed to the pressure chamber.

With the above first feature of the present invention, the pressure receiving area of the urging piston, exposed to the pressure chamber, is set smaller than that of the input piston, exposed to the pressure chamber. Therefore, even if the fluid pressure in the reaction chamber is varied, the variation in volume of the pressure chamber, due to the forward and rearward sliding movement of the sliding member, can be reduced to a relatively small level to suppress the kick-back to a small level. Moreover, the force required to advance the sliding member, in the condition in which a fluid pressure has been generated in the reaction chamber, can be reduced to a relatively small level. The ratio of the pressure receiving area of the urging piston, exposed to the pressure chamber to the pressure receiving area of the sliding member, exposed to the reaction chamber is greater than a ratio of the pressure receiving area of the input piston, exposed to the pressure chamber of the urging piston, exposed to the pressure chamber (i.e., $A_2/A_1 > A_3/A_2$).

According to a second aspect and feature of the present invention, in addition to the above first feature, the pressure chamber is connected to the fluid pressure operated device via a bypass valve which becomes closed in response to a rise in a pressure output from the output port.

With the above second feature of the present invention, in addition to the first feature, the pressure chamber is connected to the fluid pressure operated device via a bypass valve adapted to be closed in response to the rise in pressure output from the output port. Therefore, it is possible to insure a fluid pressure required to drive the fluid pressure operated device when the pressure output from the fluid pressure supply source has been abnormally reduced, and to reduce the invalid stroke in such event.

The above and other objects, features and advantages of the invention will become more apparent from a consideration of the following description of the preferred embodiments, taken in conjunction with the accompanying drawings.

BRIEF DESCRIPTION OF THE DRAWINGS

FIGS. 1 to 7 illustrate a preferred embodiment of the present invention, wherein

DESCRIPTION OF THE PREFERRED EMBODIMENTS

Figure 1:
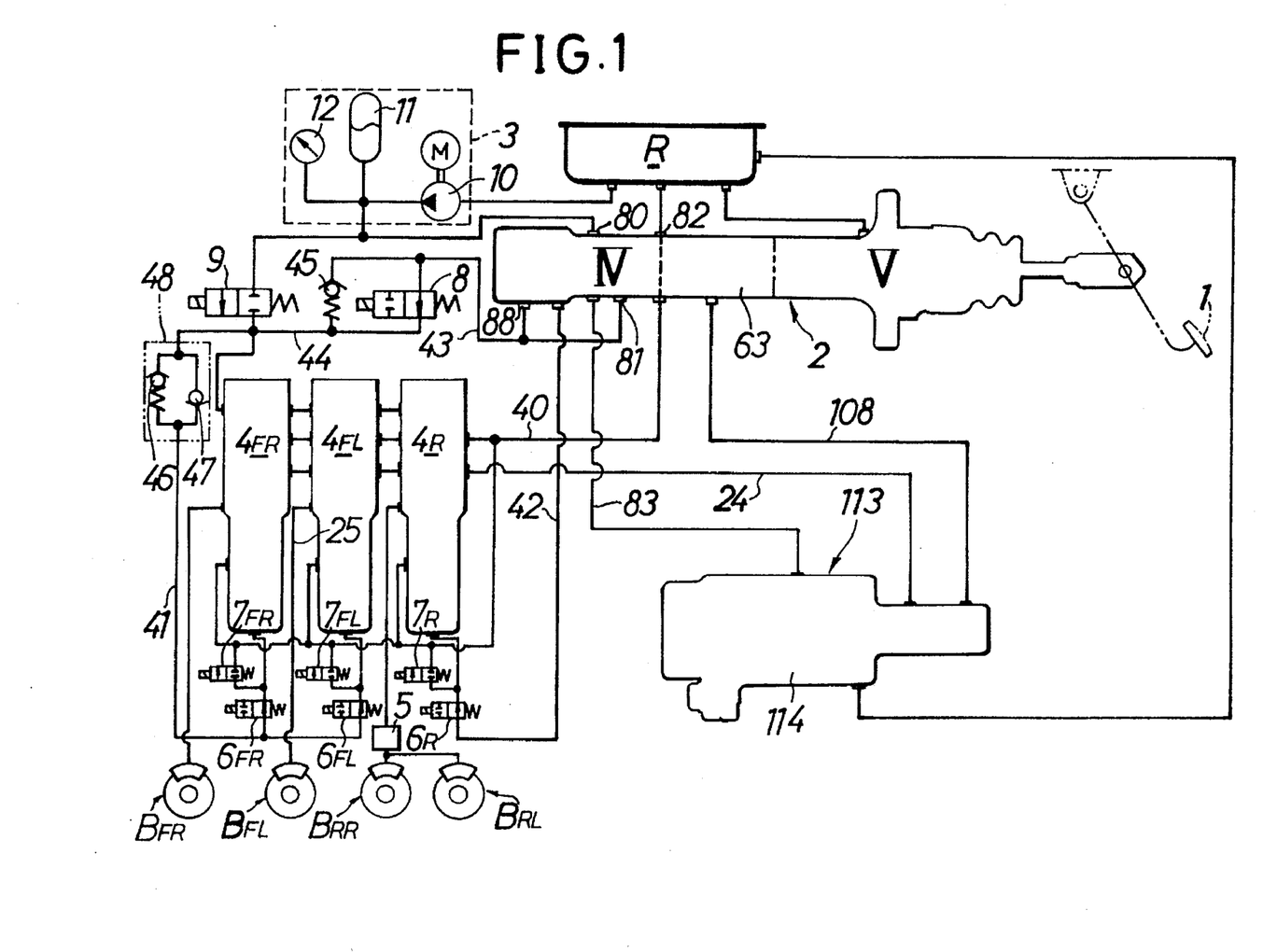
FIG. 1 is a diagram of a fluid pressure circuit of a braking pressure control system using the fluid pressure control device of the embodiment.

Referring, first, to FIG. 1, a left front wheel brake device $B_{FL}$ and a right front wheel brake device $B_{FR}$ are mounted on left and right front wheels, respectively, as driving wheels of a vehicle and a left rear brake device $B_{RL}$ and right rear wheel brake device $B_{RR}$ are mounted on left and right rear wheels as follower wheels, respectively. A fluid pressure control device 2 is connected to a brake pedal 1, as an operation member, and is capable of controlling the output fluid pressure from a fluid pressure supply source 3 in accordance with the amount brake pedal 1 is depressed. The fluid pressure control device can deliver a fluid pressure, corresponding to the amount brake pedal 1 is depressed, when the output pressure from the fluid pressure supply source 3 is abnormally reduced. Thus, during a normal braking, in which the output pressure from the fluid pressure supply source 3 is normal, an amplified fluid pressure is delivered from the fluid pressure control device 2 and is applied to the front wheel brake devices $B_{FL}$ and $B_{FR}$, through fluid pressure transmitting units $4_{FL}$ and $4_{FR}$ and to the rear wheel brake devices $B_{RL}$ and $B_{RR}$ through a fluid pressure transmitting unit $4_R$ and a proportional reduction valve 5. When the output fluid pressure from the fluid pressure supply source 3 is abnormally reduced, a non-amplified fluid pressure is delivered from the fluid pressure control device 2, in accordance with the depression amount of the brake pedal 1, and is applied to the front wheel brake devices $B_{FL}$ and $B_{FR}$, through the fluid pressure transmitting units $4_{FL}$ and $4_{FR}$, and to the rear wheel brake devices $B_{RL}$ and $B_{RR}$, through the fluid pressure transmitting unit $4_R$ and the proportional reduction valve 5. Further, the braking fluid pressure of each of the brake devices $B_{FL}$, $B_{FR}$, $B_{RL}$ and $B_{RR}$ can be maintained, or reduced, by inlet valves $6_{FL}$ and $6_{FR}$ and outlet valves $7_{FL}$ and $7_{FR}$, individually, corresponding to the front wheel brake devices $B_{FL}$ and $B_{FR}$, as well as an inlet valve $6_R$ and an outlet valve $7_R$ which are common to the rear wheel brake devices $B_{RL}$ and $B_{RR}$, thereby effecting antilock control. The braking fluid pressure of the front wheel brake devices $B_{FL}$ and $B_{FR}$ can be increased by controlling the opening and closing of a normally opened type traction control solenoid valve 8 and a normally closed type traction control solenoid valve 9, thereby effecting traction control.

The fluid pressure supply source 3 comprises a fluid pump 10 for pumping working fluid, such as oil from reservoir R, an accumulator 11 connected to the fluid pump 10, and a pressure switch 12 for controlling the operation of the fluid pump 10.

The fluid pressure transmitting units $4_{FL}$, $4_{FR}$ and $4_R$ basically have the same construction and, hence, the construction of a typical one of the fluid pressure transmitting units $4_{FL}$ will be described below.

Figure 2:
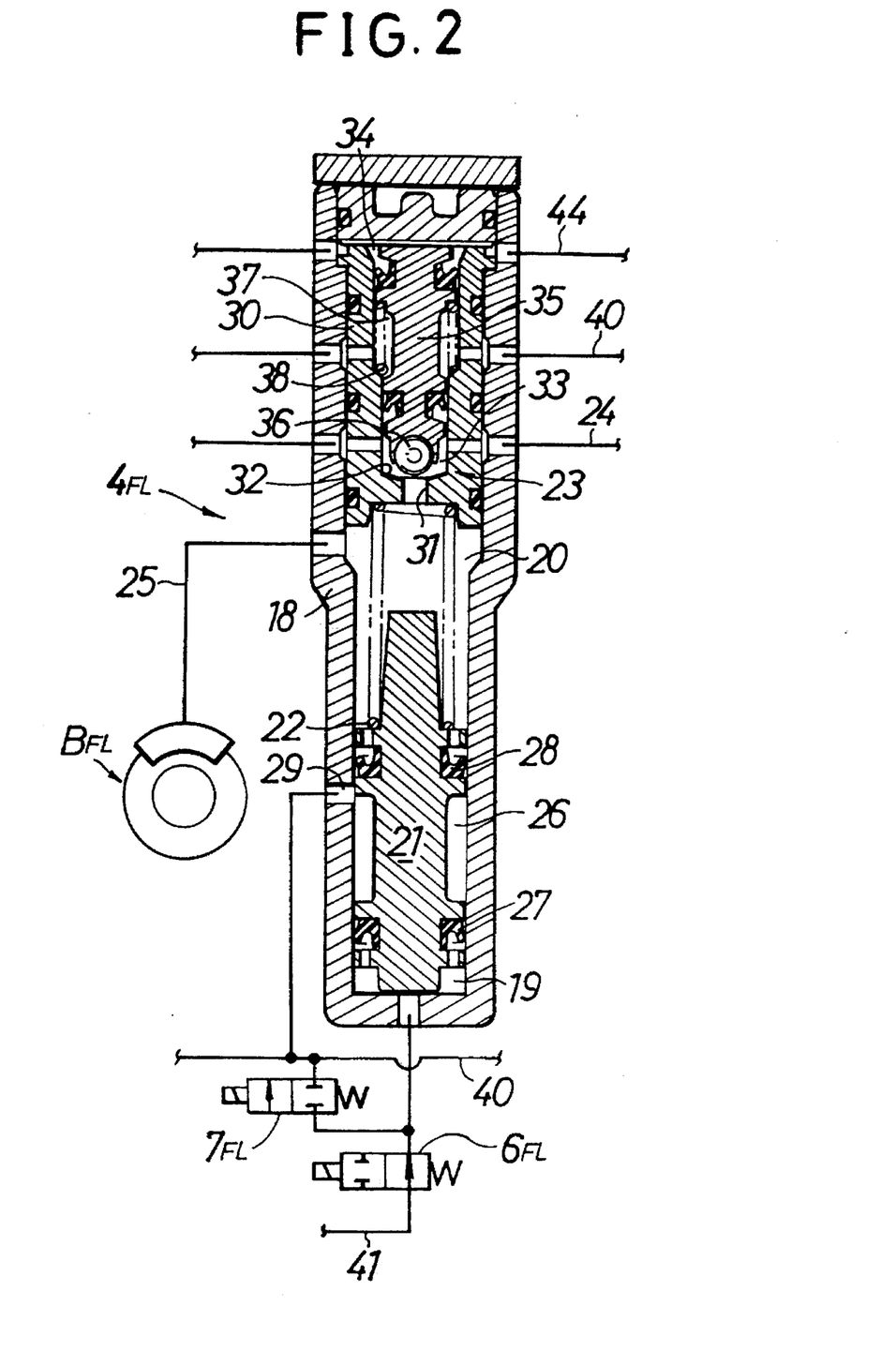
FIG. 2 is a longitudinal sectional view illustrating the fluid pressure transmitting unit in the system of FIG. 1.

Referring to FIG. 2, the fluid pressure transmitting unit $4_{FL}$ comprises a cylindrically-shaped housing 18, closed at its opposite ends, a free piston 21 slidably received in the housing 18, with its opposite ends exposed to an input fluid pressure chamber 19 and an output fluid pressure chamber 20, a spring 22 accommodated in the output fluid pressure chamber 20 to bias the free piston 21 toward the input fluid pressure chamber 19, and a bypass valve 23, mounted within the housing 18, for cutting off the communication between passage 24 and the output fluid pressure chamber 20, when the output fluid pressure from the fluid pressure supply source 3 is normal, but to put the passage 24 and the output fluid pressure chamber 20, into communication with each other, when the output fluid pressure, from the fluid pressure supply source 3, is abnormally reduced.

The output fluid pressure chamber 20 is connected to the brake device $B_{FL}$ through passage 25. An annular recess is provided around an outer periphery of the free piston 21 to define an annular chamber 26 between the free piston 21 and an inner surface of the housing 18. A seal member 27 is mounted around the outer periphery of the free piston 21 between the annular chamber 26 and the input fluid pressure chamber 19, and a seal member 28 is mounted around the outer periphery of the free piston 21 between the annular chamber 26 and the output fluid pressure chamber 20. At least the seal member 28 is a cup seal for permitting flow of a working fluid from the annular chamber 26 to the output fluid pressure chamber 20. Moreover, the housing 18 is provided with a communication hole 29 leading to the annular chamber 26 irrespective of the stroke of the free piston 21. The communication hole 29 is connected, through a release passage 40, to the reservoir R. The annular chamber 26 is normally in communication with the reservoir R.

The bypass valve 23 comprises a valve housing 30, a valve seat 32, a drive piston 35, a valve sphere 36 and a spring 38. The valve housing 30 is cylindrically shaped and fixedly fitted within the housing 18 to define the output fluid pressure chamber 20 between the valve housing 30 and the free piston 21. The valve seat 32 is provided on a portion of the valve housing 30 closer to the output fluid pressure chamber 20 and has a valve bore 31 opened, at its central portion, to communicate with the output fluid pressure chamber 20. The drive piston 35 is slidably received in the valve housing 30 to define a valve chest 33 leading to the passage 24 between the drive piston 35 and the valve seat 32 and to have its end opposite from the valve chest 33 exposed to a pilot chamber 34. The valve sphere 36, accommodated in the valve chest 33, for seating on the valve seat 32, is secured to a tip, or leading end, of the drive piston 35. The spring 38, accommodated in a spring chamber 37 defined between the drive piston 35 and the valve housing 30, applies a resilient force to the drive piston 35 in a direction of movement of the valve sphere 36 away from the valve seat 32. A passage 44 is connected to the pilot chamber 34. Spring chamber 37 is connected through the release passage 40 to the reservoir R.

In such bypass valve 23, when the fluid pressure in the pilot chamber 34 is lower than a given value, the drive piston 35 is moved by spring force of the spring 38 to a position in which the valve sphere 36 permits the valve bore 31 to be opened. When the fluid pressure in the pilot chamber 34 is increased up to the given value or more, the drive piston 35 is moved, so that the valve bore 36 is closed by the valve sphere 31, thereby providing a closed state of the bypass valve 23.

With such construction of the fluid pressure transmitting unit $4_{FL}$, in a condition in which the bypass valve 23 has been closed, a fluid pressure, corresponding to the fluid pressure applied to the input fluid pressure chamber 19, can be delivered from the output fluid pressure chamber 20, and the working fluid in the output fluid pressure chamber 20 cannot flow toward the input fluid pressure chamber 19. On the other hand, in a condition in which the bypass valve 23 has been opened, the fluid pressure from the passage 24 can be passed to the output fluid pressure chamber 20 even in a condition in which no fluid pressure is applied to the input fluid pressure chamber 19.

Referring to FIGS. 1 and 2, the output fluid pressure chambers 20, in the fluid pressure transmitting units $4_{FL}$ and $4_{FR}$ are individually connected to the brake devices $B_{FL}$ and $B_{FR}$, respectively, and the output fluid pressure chamber 20, in the fluid pressure transmitting unit $4_R$, is connected to the brake devices $B_{RL}$ and $B_{RR}$ through the common proportional reduction valve 5.

The inlet valves $6_{FL}$ and $6_{FR}$ and the outlet valves $7_{FL}$ and $7_{FR}$ are connected, in parallel, to the input fluid pressure chambers 19 in the fluid pressure transmitting units $4_{FL}$ and $4_{FR}$, corresponding to the front wheel brake devices $B_{FL}$ and $B_{FR}$, respectively. The inlet valve $6_R$ and the outlet valve $7_R$ are connected, in parallel, to the input fluid pressure chamber 19 in the fluid pressure transmitting unit $4_R$ corresponding to the rear wheel brake devices $B_{RL}$ and $B_{RR}$.

Each of the inlet valves $6_{FL}$, $6_{FR}$ and $6_R$ is a normally opened solenoid valve, adapted to be closed during energization, and each of the outlet valves $7_{FL}$, $7_{FR}$ and $7_R$ is a normally closed solenoid valve, adapted to be opened during energization. The outlet valves $7_{FL}$, $7_{FR}$ and $7_R$ are interposed between the input fluid pressure chambers 19 in the fluid pressure transmitting units $4_{FL}$, $4_{FR}$ and $4_R$ and the release passage 40, leading to the reservoir R, respectively. The inlet valves $6_{FL}$ and $6_{FR}$ are interposed between the input fluid pressure chamber 19, in the fluid pressure transmitting units $4_{FL}$ and $4_{FR}$, and a passage 41, respectively. The inlet valve $6_R$ is interposed between the input fluid pressure chamber 19, in the fluid pressure transmitting unit $4_R$ and a passage 42.

The proportional reduction valve 5 has a conventionally well-known structure and serves to proportionally reduce the fluid pressure delivered from the output fluid pressure chamber 20, in the fluid pressure transmitting unit $4_R$, to apply a reduced fluid pressure to the rear wheel brake devices $B_{RL}$ and $B_{RR}$.

The normally opened type traction control solenoid valve 8 is interposed between the passages 43 and 44 and shiftable between a state in which the passages 43 and 44 are put into communication with each other by the deenergization thereof, and a state in which the communication between the passages 43 and 44 is cut off by the energization thereof. The normally closed type traction control solenoid valve 9 is interposed between the fluid pressure supply source 3 and the passage 44 and shiftable between a state in which the communication between the fluid pressure supply source 3 and the passage 44 is cut off, by the deenergization thereof, and a state in which the fluid pressure supply source 3 and the passage 44 are put into communication with each other, by energization thereof. Both the solenoid valves 8 and 9 are energized when the traction control is conducted.

A one-way valve 45, for permitting a flow of the working fluid from the passage 43 to the passage 44, is connected, in parallel, to the normally-opened solenoid valve 8. The fluid pressure in the passage 43, delivered from the fluid pressure control device 2, is led through this valve 45 into the passage 44, when the braking has been conducted by the brake pedal 1 during execution of the traction control.

A flow restraining unit 48 is interposed between the passages 44 and 41 and comprises a differential pressure regulating valve 46 for permitting a flow of the working fluid from the passage 44 to the passage 41, in response to the fluid pressure in the passage 44 becoming larger than that in the passage 41 by a predetermined value or more, and a cup seal 47 functioning as a one-way valve, for permitting a flow of the working fluid from the passage 41 to the passage 44 in response to the fluid pressure in the passage 41 becoming slightly larger than that in the passage 44.

Figure 3:
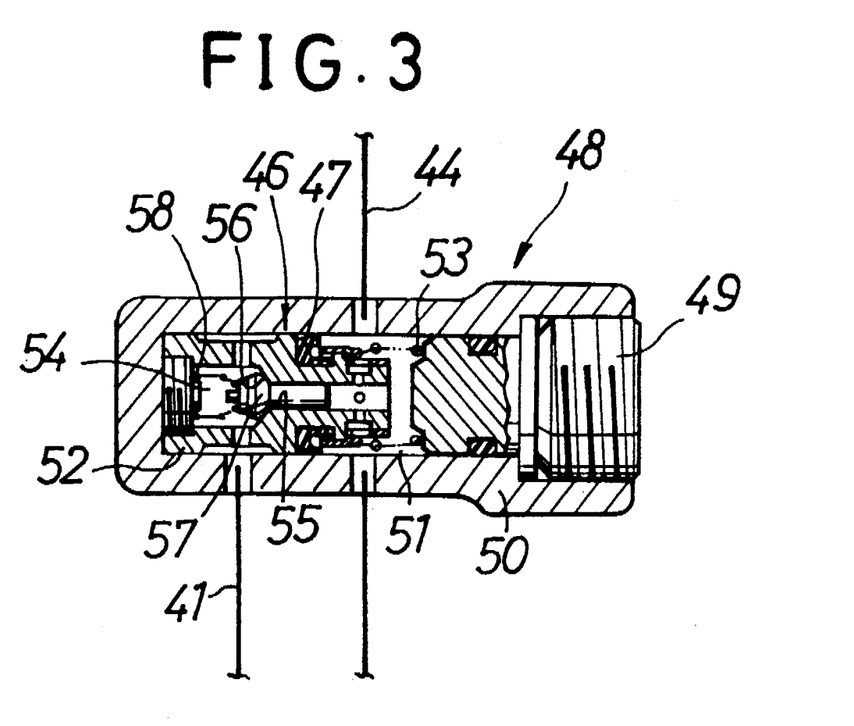
FIG. 3 is a longitudinal sectional view illustrating the construction of a flow restraining unit in the system of FIG. 1.

Referring to FIG. 3, the flow restraining unit 48 comprises a bottomed cylindrical housing 50 with an open end closed by a plug member 49. The differential pressure regulating valve 46 is mounted in the housing 50 and comprises a valve housing 52 received in the housing 50 to define fluid chamber 51 leading to the passage 44 between the valve housing 52 itself and the plug member 49. The cup seal 47 is mounted to an outer periphery of the valve housing 52 to come into sliding contact with an inner surface of the housing 50. A spring 53 is mounted, in a compressed manner, between the valve housing 52 and the plug member 49 for biasing the valve housing 52 toward the bottom end of the housing 50.

The differential pressure regulating valve 46 comprises a valve member 57 capable of seating on a valve seat 56 provided on the valve housing 52 and having a valve bore 55 opened at a central portion thereof to lead to the fluid chamber 51, and a spring 58 for exhibiting a resilient force in a direction to allow the valve member 57 to be seated on the valve seat 56. The valve member 57 and the spring 58 are accommodated in a valve chest 54, defined within the valve housing 52, to lead to the passage 41. Thus, the differential pressure regulating valve 46 is opened in response to the fluid pressure in the fluid chamber 51, leading to the passage 44, becoming higher than that in the valve chest 54, leading to the passage 41, by a predetermined value.

The cup seal 47 is mounted to the outer periphery of the valve housing 52 in such manner to block flow of the working fluid from the fluid chamber 51 to the passage 41, but to permit a flow of the working fluid from the passage 41 to the fluid chamber 51, when the fluid pressure in the passage 41 has become larger than that in the fluid chamber 51.

With the differential pressure regulating valve 46 at an initial stage of the braking operation, the flow of the working fluid from the passage 44 to the passage 41 leading to the input fluid pressure chamber 19 in the fluid pressure transmitting unit $4_{FL}$, $4_{FR}$ is blocked until the bypass valve 23 in each of the fluid pressure transmitting units $4_{FL}$, $4_{FR}$ and $4_R$ is closed in response to an increase in fluid pressure in the pilot chamber 34 therein. In other words, after closing of each of the bypass valves 23, the fluid pressure is applied to the input fluid pressure chamber 19 in the fluid pressure transmitting unit $4_{FL}$, $4_{FR}$. When a braking operation force is released, the working fluid in the passage 41 is escapes to the reservoir R by the aid of the cup seal 47.

Figure 4:
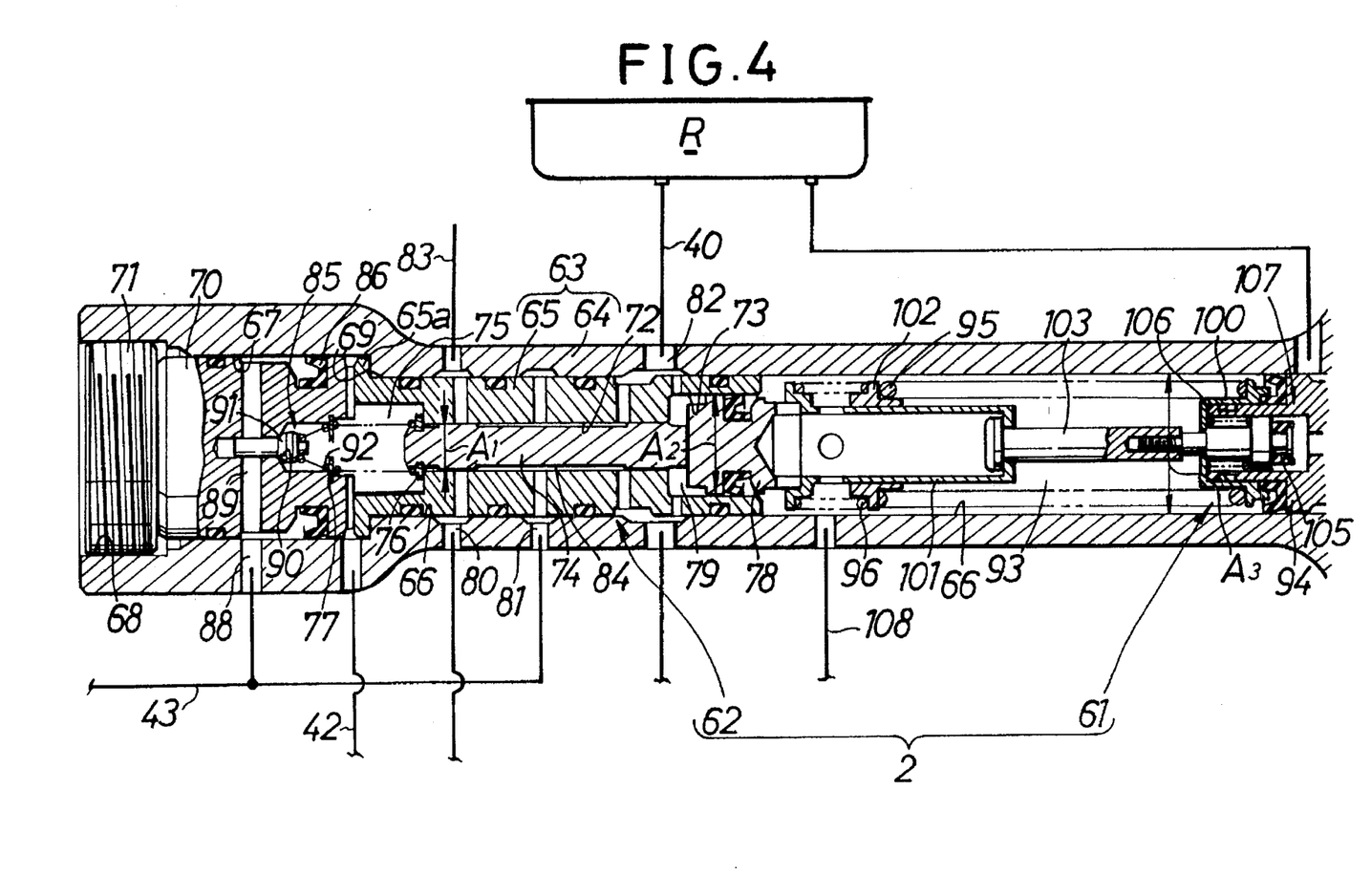
FIG. 4 is a longitudinal sectional view of a portion IV of the fluid pressure control device shown in FIG. 1.
Figure 5:
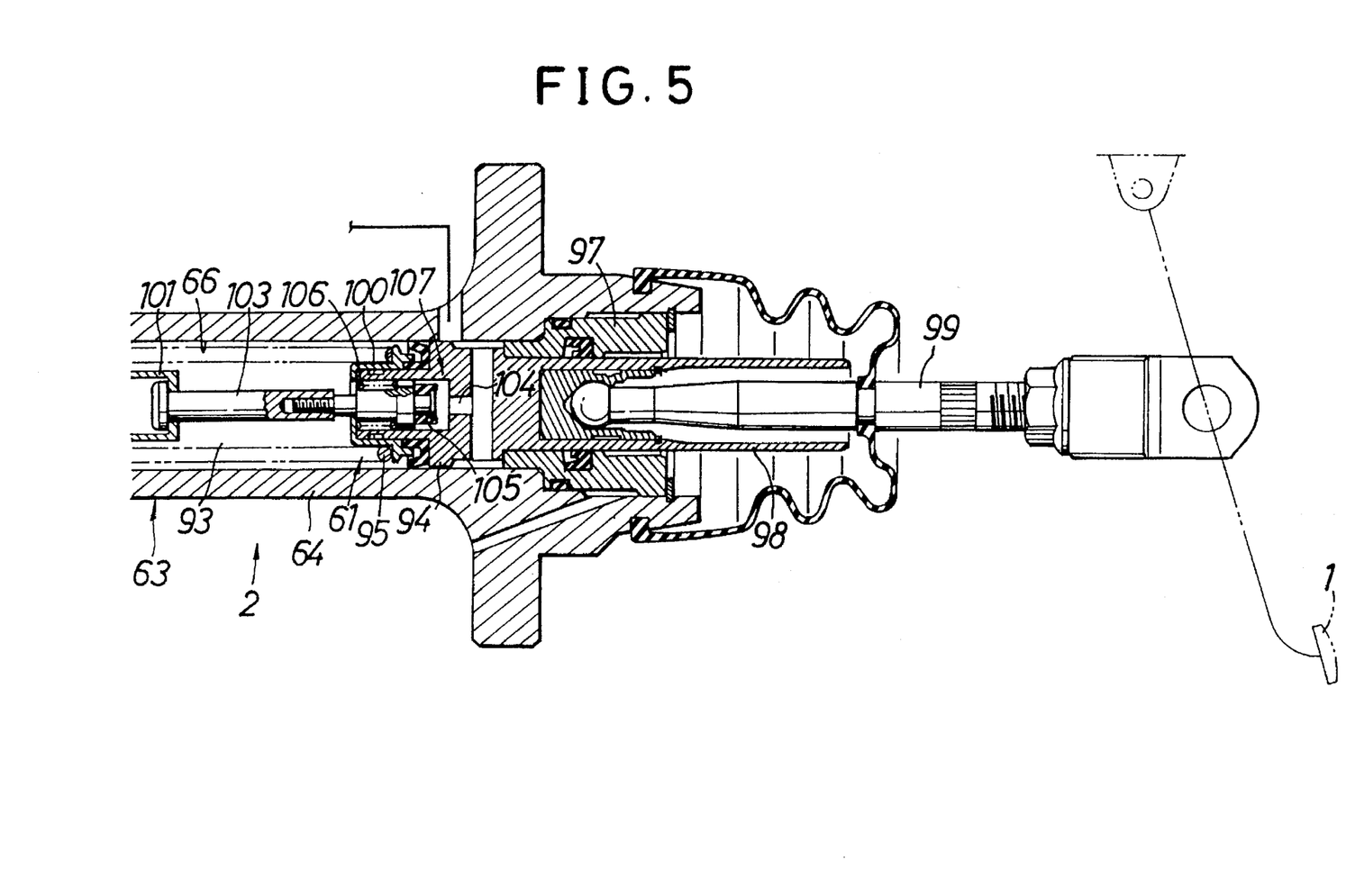
FIG. 5 is a longitudinal sectional view of the remaining portion V of the fluid pressure control device shown in FIG. 1.

Referring to FIGS. 4 and 5, the fluid pressure control device 2 comprises an auxiliary fluid pressure generating means 61, capable of generating a non-amplified fluid pressure corresponding to a braking operation force on the brake pedal 1, and a fluid pressure control valve 62, capable of controlling the output pressure from the fluid pressure supply source 3 in accordance with the amount of brake pedal 1 operated to deliver an amplified fluid pressure.

The fluid pressure control device 2 has a housing 63, which is comprised of a large cylinder body 64 and a small cylinder body 65 fixedly received in a front end of the large cylinder body 64. Provided within the large cylinder body 64 are a cylinder bore 66, a receiving bore 67, coaxially connected to a front end of the cylinder bore 66, with a diameter larger than that of the cylinder bore 66, and a threaded bore 68 coaxially connected to a front end of the receiving bore 67 with a diameter larger than that of the receiving bore 67. The small cylinder body 65 is formed into a cylindrical shape having, at a front end thereof, an engage collar 65a, engaging a step 69 between the cylinder bore 66 and the receiving bore 67, and is fitted in the cylinder bore 66. Moreover, a plug member 70 is fitted into the receiving bore 67, and the engage collar 65a is clamped between the plug member 70 and the step 69 by tightening a threaded member 71 screwed in the threaded bore 68, thereby fixing the small cylinder body 65 within the larger cylinder body 64. In addition, the small cylinder body 65 is provided with a smaller slide bore 72 and a larger slide bore 73 coaxially connected to the rear end of the smaller slide bore 72.

The fluid pressure control valve 62 comprises a spool 74 as a sliding member slidably received in the smaller slide bore 72 in the small cylinder body 65. A reaction chamber 75, to which a front surface of the spool 74 is exposed, is defined between the small cylinder body 65 and the plug member 70 and connected to the passage 42. A retaining ring 76 is fitted over a front end of the spool 74 and abuts against the small cylinder body 65 to provide a retract limit for the spool 74. A spring 77 is mounted in a compressed manner in the reaction chamber 75, between the plug member 70 and the retaining ring 76, for biasing the spool 74 rearwardly.

An urging piston 78, as one component of the auxiliary fluid pressure generating means 61, is slidably received in the larger slide bore 73 in the small cylinder body 65 and abuts against a rear end of the spool 74. A release chamber 79 is defined between the urging piston 78 and the small cylinder body 65 and connected to the reservoir R. Thus, a rearward force is applied to the spool 74, by a fluid pressure in the reaction chamber 75 and by the spring 77, and a forward force is applied to the spool 74, by the urging piston 78. The position of the spool 74, within the small cylinder body 65, is determined by a balance of these forces.

An input port 80, an output port 81 and a release port 82 are provided in the larger and small cylinder bodies 64 and 65, cooperating with each other to constitute the housing 63, at distances in sequence from an axially front side to an axially rear side thereof and are opened into an inner surface of the smaller slide bore 72. The input port 80 is connected to a passage 83 leading to the fluid pressure supply source 3; the output port 81 is connected to the passage 43, and the release port 82 is connected, through the release passage 40, to the reservoir R. Moreover, an annular recess 84 is provided around an outer periphery of the spool 74 and has an axial length, set so that the output port 81 is in communication with the release port 82, when the spool 74 is in its advanced position. The output port 81 is in communication with the release port 82, through the annular recess 84, and out of communication with the input port 80, when the spool 74 is in its retracted position.

Provided between the passage 43 leading to the output port 81 and the reaction chamber 75 are a differential pressure regulating valve 85 for permitting a flow of the working fluid from the passage 43 to the reaction chamber 75 in response to the fluid pressure in the passage 43, i.e., at the output port 81, becoming larger than that in the reaction chamber 75 by a predetermined value or more, and a cup seal 86 functioning as a one-way valve for permitting a flow of the working fluid from the reaction chamber 75 to the passage 43 in response to the fluid pressure in the reaction chamber 75 becoming slightly larger than that in the passage 43.

An introduction port 88 is provided in the large cylinder body 64 of the housing 63 so as to lead to the passage 43. The differential pressure regulating valve 85 is mounted in the large cylinder body 64 for opening and closing a passage 89, provided in the plug member 70, so as to connect the introduction port 88 and the reaction chamber 75 to each other. The differential pressure regulating valve 85 comprises a valve seat 90, opened into the reaction chamber 75 leading to the passage 89, a valve member 91, accommodated in the reaction chamber 75 and seatable on the valve seat 90, and a spring 92, for biasing the valve member 91 in a direction to seat on the valve seat 90. The cup seal 86 is mounted around an outer periphery of the plug member 70 to permit a flow of the working fluid from the reaction chamber 75 to the introduction port 88.

The differential pressure regulating valve 85 functions to increase the fluid pressure delivered into the passage 43 to a certain value, before an operational reaction force is generated at an initial stage of the braking operation, by the fact that no fluid pressure is generated in the reaction chamber 75, until the fluid pressure delivered from the output port 81 in the fluid pressure control device 2 into the passage 43, at the initial stage of the braking operation, reaches a certain value, and to inhibit the delivery of the fluid pressure into the passage 42, leading to the input fluid pressure chamber 19 in the fluid pressure transmitting unit $4_R$, until the bypass valve 23 in the fluid pressure transmitting unit $4_R$ is closed. Thus, at the initial stage of the braking operation, the fluid pressure in the passage 42 is applied to the input fluid pressure chamber 19 in the fluid pressure transmitting unit $4_R$, after the bypass valve 23, in the fluid pressure transmitting unit $4_R$ is closed. The cup seal 86 functions to permit escape of the working fluid in the passage 42 from the passage 43, via the output port 81, the annular recess 84 and the release port 82 into the reservoir R, when the braking operation force is released.

The auxiliary fluid pressure generating means 61 comprises the urging piston 78, slidably received in the larger slide bore 73 and operatively connected to the rear end of the spool 74 in the fluid pressure control valve 62, an input piston 94 operatively connected to the brake pedal 1 and slidably received in the cylinder bore 66 with its front surface exposed to a pressure chamber 93 defined between the input piston 94 and a back of the urging piston 78, and a pair of springs 95 and 96 interposed in series between both the pistons 78 and 94.

As is apparent from FIG. 5, a restraining member 97, for providing a retract limit for the input piston 94, is fixed in an opening at a rear end of the large cylinder body 64 of the housing 63, and a piston rod 98 is coaxially connected to the input piston 94 and movably extends through the restraining member 97 in a fluid-tight manner. A push rod 99 is connected to the brake pedal 1 and also swigably connected at its front end to the piston rod 98. Thus, the input piston 94 is advanced, in a direction to reduce the volume of the pressure chamber 93, in response to the depressing operation of the brake pedal 1.

A cup-like retainer 100 is fitted over a front end of the input piston 94, and a bottomed cylindrical retainer 101 is mounted to abut against the back of the urging piston 78. The springs 95 and 96 are mounted in the compressed manner, between both the retainers 100 and 101, with a guide member 102 interposed between both the springs 95 and 96. The guide member 102 is slidably fitted over the retainer 101. A rod 103 is movably mounted to extend through the retainer 101, with its rear end engaging the retainer 100, in such the manner that a retract limit position of the rod relative to the urging piston 78 is provided by the retainer 101. This defines the maximum spacing between the urging piston 78 and the input piston 94. The spring constant of the spring 95 is set relatively large, while the spring constant of the spring 96 is set relatively small.

A shut-off valve 107, for switching-over the communication and the cut-off of the communication between the pressure chamber 93 and the reservoir R, is comprised of a valve bore 104, provided in the input piston 94 to lead to the reservoir R, a valve member 105, mounted at the rear end of the rod 103, and a spring 106, mounted between the rod 103 and the retainer 100 to bias the rod 103 in a direction to close the valve bore 104. The shut-off valve 107 is designed to be opened to put the pressure chamber 93 into communication with the reservoir R in a condition in which the spacing between the urging piston 78 and the input piston 94 is maximal, and to be closed to cut off the communication between the pressure chamber 93 and the reservoir R, when the input piston 94 is advanced relative to the rod 103 from such condition.

In such fluid pressure control device 2, a pressure receiving area $A_1$ of the spool 74, exposed to the reaction chamber 75, is smaller than a pressure receiving area $A_2$ of the urging piston 78, exposed to the pressure chamber 93, and a pressure receiving area $A_3$ of the input piston 94, exposed to the pressure chamber 93, is larger than the pressure receiving area $A_2$ of the urging piston 78. That is, the relationship $A_1 < A_2 < A_3$ is established.

A passage 108 is connected to the pressure chamber 93, in the auxiliary fluid pressure generating means 61, and also to a stroke accumulator 113, as shown in FIG. 1.

Figure 6:
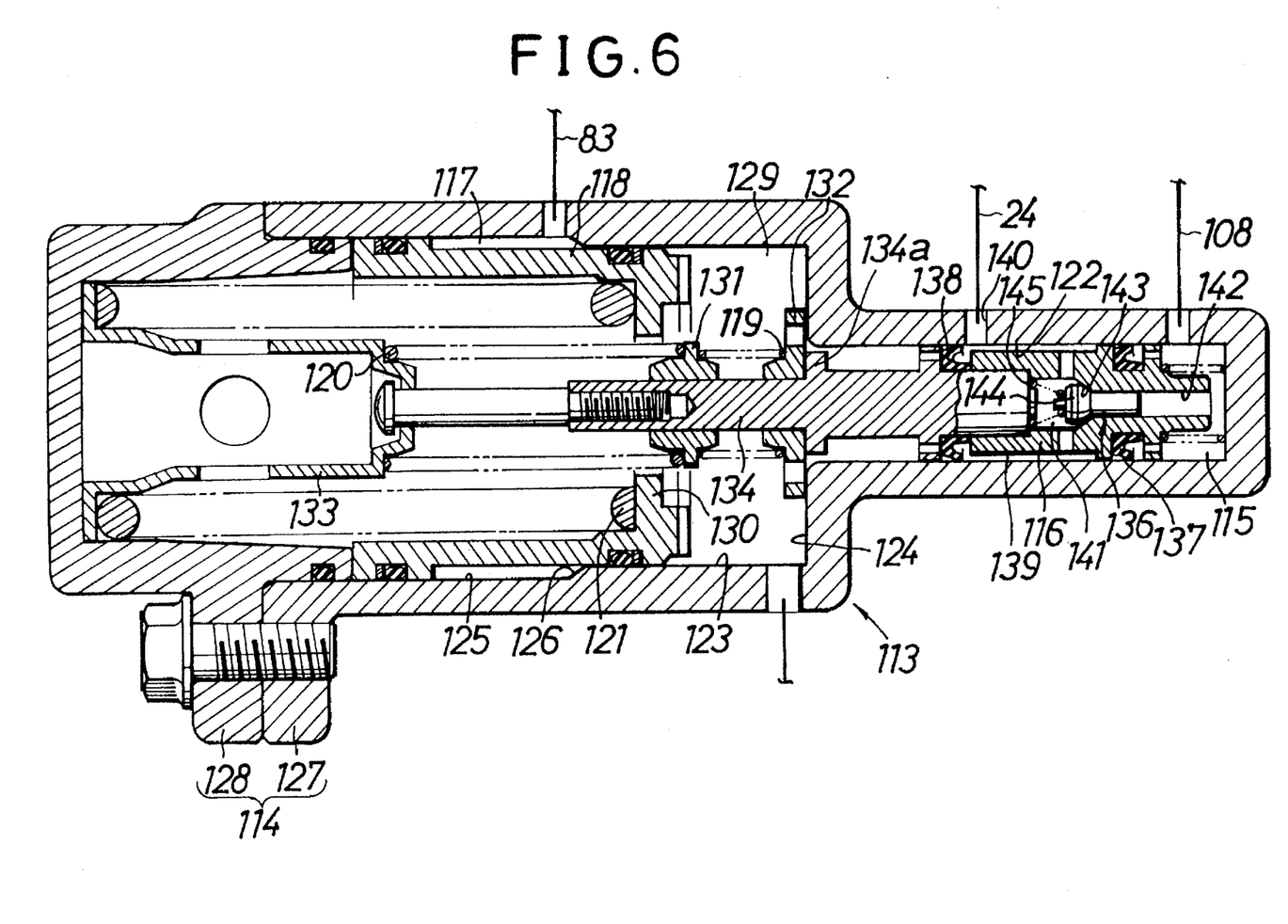
FIG. 6 is a longitudinal sectional view illustrating the construction of a stroke accumulator in the system of FIG. 1.

Referring to FIG. 6, the stroke accumulator 113 comprises a casing 114, an accumulator piston 116, slidably received in the casing 114 to define an accumulating chamber 115 leading to the passage 108 between the piston 116 itself and the casing 114, a back-up piston 118 defining, between the piston 118 itself and the casing 114, a pilot chamber 117 which communicates with the passage 83, leading to the fluid pressure supply source 3, first and second accumulator springs 119 and 120, for resiliently biasing the accumulator piston 116 in a direction to reduce the volume of the accumulating chamber 115, and a back-up spring 121 which exhibits a spring load larger than those of the accumulator springs 119 and 120 to resiliently bias the back-up piston 118 in a direction to reduce the volume of the pilot chamber 117.

The casing 114 is comprised of a stepped bottomed cylindrical member 127 and a plugging member 128, closing an opened end of the cylindrical member 127. The stepped bottomed cylindrical member 127 includes a first cylinder bore 122, closed at one end, a second cylinder bore 123, having a diameter larger than that of the first cylinder bore 122 and coaxially connected at one end to the other end of the first cylinder bore with a step 124 interposed therebetween, and a third cylinder bore 125, having a diameter larger than that of the second cylinder bore 123 and coaxially connected at one end to the other end of the second cylinder bore 123 with a tapered step 126 interposed therebetween.

The accumulator piston 116 is slidably received in the first cylinder bore 122 to define the accumulating chamber 115 between the piston 116 itself and one end wall of the casing 114. The back-up piston 118 is slidably received in the second and third cylinder bores 123 and 125 to define a release chamber 129 leading to the reservoir R between the back-up piston 118 itself and the accumulator piston 116. The pilot chamber 117 is defined between the step 126, as well as an inner surface of the third cylinder bore 125 and an outer surface of the back-up piston 118, and leads to the fluid pressure supply source 3.

The back-up piston 118 is cylindrically shaped and provided, at its front end, i.e., at a portion closer to the accumulator piston 116, with a receiving collar 130 protruding radially inwardly.

The first and second accumulator springs 119 and 120 are interposed, in series, between retainers 132 and 133, with a guide member 131 interposed between both the springs 119 and 120. A piston rod 134 is coaxially connected to the accumulator piston 116 and has a radially outwardly protruding collar 134a provided at an intermediate portion thereof. The retainer 132 is formed into a disk-like shape surrounding the piston rod 134 to engage the collar 134a. The retainer 133 is formed into a bottomed cylindrical shape with its opened end abutting against the plugging member 128. Further, the guide member 131 is slidably fitted over the piston rod 134. The first accumulator spring 119 is disposed between the retainer 132 engaging the collar 134a of the piston rod 134 and the guide member 131, and the second accumulator spring 120 is disposed between the guide member 131 and the retainer 133 carried by the plugging member 128. The load characteristics of the accumulator springs 119 and 120 are established differently, so that the spring loads for biasing the accumulator piston 116 toward the accumulating chamber 115 are varied in the middle of movement of the accumulator piston 116 in a direction to increase the volume of the accumulating chamber 115.

The back-up spring 121 is mounted in a compressed manner within the release chamber 129 between the receiving collar 130 of the back-up piston 118 and the retainer 133.

In such stroke accumulator 113, in a condition in which the fluid pressure control device 2 is normally operative, so that a normal fluid pressure from the fluid pressure control device 2 is effective, the back-up piston 118 has been moved against the biasing force of the back-up spring 121 in a direction to increase the volume of the pilot chamber 117, i.e., away from the accumulator piston 116. However, if the operation of the fluid pressure control device 2 is disordered, resulting in an abnormal reduction in fluid pressure in the pilot chamber 117, the back-up piston 118 is moved, by the spring force of the back-up spring 121, in the direction to reduce the volume of the pilot chamber 117, i.e., toward the accumulator piston 116, so that the receiving collar 130 of the back-up piston 118 abuts against the retainer 132. Thus, in place of the first and second accumulator springs 110 and 120, the large spring load of the back-up spring 121 is applied to the accumulator piston 116.

In this stroke accumulator 113, the maximum spacing between the accumulator piston 116 and the retainer 133 is defined by the engagement of the retainer 133 with the piston rod 134 connected to the accumulator piston 116. The maximum spacing between the retainer 133 and the back-up piston 118 is defined by the engagement of the back-up piston 118 with the accumulator piston 116. That is, the maximum spacing between the retainer 133 and the back-up piston 118 is defined by the engagement of the back-up piston 118 with the retainer 132 engaging the collar 134a of the piston rod 134. Therefore, the accumulator piston 116, the retainer 132, the accumulator springs 119 and 120, the retainer 133, the back-up piston 118 and the back-up spring 121 can be assembled as an interior assembly separately from the casing 114. The assembling of the stroke accumulator 113 is completed by merely assembling the plugging member 128 to the bottomed cylindrical member 127, after insertion of the interior assembly into the bottomed cylindrical member 127, leading to an enhanced assembling workability of the stoke accumulator.

It should be noted that the stroke accumulator 113 is provided with a differential pressure regulating valve 136 for permitting a flow of the working fluid from the accumulating chamber 115 to the passage 24, when the fluid pressure in accumulating chamber 115 becomes larger than that in the passage 24 by a predetermined value or more, a cup seal 137 functioning as a one-way valve for permitting a flow of the working fluid from the passage 24 to the accumulating chamber 115, in response to the fluid pressure in the passage 24 becoming larger than that in the accumulating chamber 115, and a cup seal 138 functioning as a one-way valve for permitting a flow of the working fluid from the release chamber 129 leading to the reservoir R to the passage 24, when the passage 24 is depressurized.

An annular recess is provided around an outer periphery of the accumulator piston 116 to define an annular chamber 139 between the piston 116 and an inner surface of the first cylinder bore 122 in the casing 114. A connecting bore 140, leading to the annular chamber 139, is provided in the bottomed cylindrical member 127 of the casing 114, and the passage 24 is connected to the connecting bore 140. Therefore, the annular chamber 139 is connected to the passage 24.

The differential pressure regulating valve 136 comprises a valve member 144 and a spring 145 which are accommodated in a valve chest 141. The valve chest 141 is provided in the accumulator piston 116 to communicate with the annular chamber 139. A valve seat 143 is provided on the accumulator piston 116 to face the interior of the valve chest 141 and having a valve bore 142 is provided in the piston 116 and opened at a central portion of the valve seat 145 and leads to the accumulating chamber 115. A spring 145 is provided for exhibiting a resilient force in a direction to allow the valve member 144 to be seated on the valve seat 143, in the valve chest 141 connected to the valve chests 33 in the bypass valve 23 in the fluid pressure transmitting units $4_{FL}$, $4_{FR}$ and $4_R$ through passage 24 and the annular chamber 139 is lower than that in the accumulating chamber 115 by a given value or more.

The cup seal 137 is mounted around the outer periphery of the accumulator piston 116 between the annular chamber 139 and the accumulating chamber 115, while the cup seal 138 is mounted around the outer periphery of the accumulator piston 116 between the annular chamber 139 and the release chamber 129.

The differential pressure regulating valve 136 ensures that the application of the output pressure from the auxiliary fluid pressure generating means 61 to the valve chests 33 in the fluid pressure transmitting units $4_{FL}$, $4_{FR}$ and $4_R$ is avoided, until the fluid pressure generated in the pressure chamber 93 in the auxiliary fluid pressure generating means 61 in the fluid pressure control device 2 becomes equal to or more than a certain value as a result of the braking operation of the brake pedal 1. Thus, the differential pressure regulating valve 136 can be opened, after the bypass valve 23 is closed, in response to an increase in pilot pressure in the pilot chamber 34. Advancing movements of braking pistons in the brake devices, due to wear of brake pads, and a breathing in the passage 24 due to temperature variation and the like can be accepted by means of the cup seal 137 when the pressure increases and by means of the cup seal 138 when the pressure decreases.

The operation of this embodiment will be described below. First, suppose that a usual braking is effected in a condition in which the fluid pressure supply source 3 is normally operative. In this case, the inlet valves $6_{FL}$, $6_{FR}$ and $6_R$ and the outlet valves $7_{FL}$, $7_{FR}$ and $7_R$ are in their deenergized states (as shown in FIG. 1), and the normally opened type and normally closed type traction control solenoid valves 8 and 9 are also in their deenergized states (as shown in FIG. 1). Therefore, the passage 43 permitting the amplified fluid pressure to be passed from the output port 81, in the fluid pressure control device 2, is in a state in which it is in communication with the pilot chambers 34 in the bypass valves 23 in the fluid pressure transmitting units $4_{FL}$, $4_{FR}$ and $4_R$, through the passage 44, and in which it has been connected to the input fluid pressure chambers 19 in the fluid pressure transmitting units $4_{FL}$ and $4_{FR}$, through the differential pressure regulating valve 46 and the passage 41, and also has been connected to the input fluid pressure chamber 19 in the fluid pressure transmitting unit $4_R$, through the differential pressure regulating valve 85, the reaction chamber 75 and the passage 42.

If the brake pedal 1 is depressed in this condition, the input piston 94 in the fluid pressure control device 2 is advanced to apply an advancing force to the urging piston 78, through the springs 95 and 96, thereby causing the spool 74 of the fluid pressure control valve 62 to be advanced, while compressing the spring 77.

Until the spool 74 is advanced to a position in which the input port 80 is put into communication with the output port 81, and out of communication with the release port 82, so that the output pressure in the passage 43 reaches a certain value, the fluid pressure in the reaction chamber 75, i.e., a fluid pressure enough to bias the spool 74 in a retracting direction is not generated by the function of the differential pressure regulating valve 85, and at an initial stage of the braking operation, a rapidly increasing fluid pressure is delivered to the passage 43. This causes the bypass valves 23, in the fluid pressure transmitting units $4_{FL}$, $4_{FR}$ and $4_R$, to be closed. Then, the differential pressure regulating valve 46 is opened, thereby permitting the fluid pressure from the passage 41 to be applied to the input fluid pressure chambers 19 in the fluid pressure transmitting units $4_{FL}$ and $4_{FR}$, while, when the differential pressure regulating valve 85 is opened, the fluid pressure from the passage 42 to is permitted be applied to the input fluid pressure chamber 19 in the fluid pressure transmitting unit $4_R$.

In the fluid pressure control valve 62, if a force in the retracting direction, which is a sum of the spring force of the spring 77 and a force resulting from the multiplication of the sectional area of the spool 74 by the fluid pressure in the reaction chamber 75, is larger than the spring force of the springs 95 and 96, the input piston 94 is advanced relative to the urging piston 78, while compressing the springs 95 and 96, so that the shut-off valve 107 is closed to disconnect the reaction chamber 93 from the reservoir R, thereby generating a fluid pressure in the reaction chamber 93.

Therefore, it cannot happen that an initial operation stroke is absorbed by the stroke accumulator 113, resulting in an invalid stroke, notwithstanding that the accumulating chamber 115, in the stroke accumulator 113 for insuring an operation stroke, is in communication with the pressure chamber 93.

Thereafter, the fluid pressure, in the pressure chamber 93 is accumulated in the accumulating chamber 115 in the stroke accumulator 113, so that the input piston 94 is further advanced by an operation force which opposes the biasing force of the accumulator springs 119 and 120 acting on the accumulator piston 116, thereby enabling an operation stroke to be insured by the stroke accumulator 113.

After the generation of the fluid pressure in the pressure chamber 93, the spool 74 in the fluid pressure control valve 62 is moved forwardly or rearwardly, so that the force in the retracting direction from the side of the reaction chamber 75 is balanced with the force in the advancing direction from the side of the pressure chamber 93. This causes the output pressure from the fluid pressure supply source 3 to be controlled, whereby an amplified fluid pressure, corresponding to the amount of brake pedal 1 operated, is delivered from the fluid pressure control device 2 into the passage 43. Thus, a braking force is provided in each of the brake devices $B_{FL}$, $B_{FR}$, $B_{RL}$ and $B_{RR}$ by the amplified fluid pressure. The fluid pressure circuit on the side of the source 3 and the brake devices $B_{FL}$, $B_{FR}$, $B_{RL}$, AND $B_{RR}$ are isolated from each other by the free piston 21 in each of the fluid pressure transmitting units $4_{FL}$, $4_{FR}$ and $4_R$. Therefore, gas which may be possibly incorporated into the working fluid in the fluid pressure supply source 3 is prevented from adversely affecting each of the brake devices $B_{FL}$, $B_{FR}$, $B_{RL}$ and $B_{RR}$.

When the brake pedal 1 is further operated to further advance the input piston 94 in a condition in which a fluid pressure has been generated in the reaction chamber 75, and the spool 74 has cut off the communication between the output port 81 and the input port 80, the pressure receiving area $A_2$ of the urging piston 78, exposed to the pressure chamber 93, is smaller than the pressure receiving area $A_3$ of the input piston 94, exposed to the pressure chamber 93, ($A_2<A_3$) and therefore, the amount of urging piston 78 advanced, i.e., spool 74 advanced, is larger than that of input piston 94 advanced. Thus, a relatively small operation force is only required to advance the spool 74, until the input port 80 and the output port 81 are put into communication with each other.

When the depressing force on the brake pedal 1 becomes too large during such braking and as a result, the wheel is about to become locked, one of the inlet valves $6_{FL}$, $6_{FR}$ and $6_R$, corresponding to the wheel about to become locked, is energized, thereby cutting off the communication between the passage 41 and the fluid pressure transmitting unit $4_{FL}$, $4_{FR}$ or between the passage 42 and the fluid pressure transmitting unit $4_R$. This suppresses the increase in braking force to avoid that wheel becomes locked. Nevertheless, if the wheel is likely to be brought into a locked state, the corresponding outlet valve $7_{FL}$, $7_{FR}$ or $7_R$ is energized to put the input fluid pressure chamber 19 in the corresponding one of the fluid pressure transmitting units $4_{FL}$, $4_{FR}$ or $4_R$ into communication with the reservoir R, so that the braking force is reduced, thereby eliminating the locking tendency of the wheel.

When such an antilock control is carried out, the spool 74 is slid forwardly or rearwardly with the variation in fluid pressure in the reaction chamber 75. However, because the relationship $A_1<A_2<A_3$ is established among the pressure receiving area $A_1$ of the spool 74 exposed to the reaction chamber 75, the pressure receiving area $A_2$ of the urging piston 78 exposed to the pressure chamber 93 and the pressure receiving area $A_3$ of the input piston 94 exposed to the pressure chamber 93, the variation in volume of the pressure chamber 93 with the forward or rearward sliding movement of the spool 74 is relatively small and therefore, it is possible to minimize the kick-back acting on the brake pedal 1 with the variation in fluid pressure in the reaction chamber 75. The ratio of the pressure receiving area of the urging piston, exposed to the pressure chamber to the pressure receiving area of the sliding member, exposed to the reaction chamber is greater than a ratio of the pressure receiving area of the input piston, exposed to the pressure chamber of the urging piston, exposed to the pressure chamber (i.e., $A_2/A_1>A_3/A_2$).

Suppose that the output pressure from the fluid pressure supply source 3 has been abnormally reduced, due to any trouble of the fluid pump 10, or the like, during the above-described braking. In this case, the bypass valve 23, in each of the fluid pressure transmitting units $4_{FL}$, $4_{FR}$ or $4_R$ is opened, in response to a reduction in fluid pressure delivered from the fluid pressure control device 2 into the passage 43. Thus, a fluid pressure generated in the pressure chamber 93, in response to the advancing movement of the input piston 94 by the depressing operation of the brake pedal 1, is supplied through the passage 108, the differential pressure regulating valve 136, the annular chamber 139 and the passage 24, via the bypass valves 23, in the fluid pressure transmitting units $4_{FL}$ and $4_{FR}$ to the front wheel brake devices $B_{FL}$ and $B_{FR}$, and also through the bypass valve 23 in the fluid pressure transmitting unit $4_R$ and the proportional reduction valve 5 to the rear wheel brake devices $B_{RL}$ and $B_{RR}$. Therefore, even in the condition in which the output pressure from the fluid pressure supply source 3 has been abnormally reduced, it is possible to apply the fluid pressure generated, in the pressure chamber 93 in the auxiliary fluid pressure generating means 61, to each of the brake devices $B_{FL}$, $B_{FR}$, $B_{RL}$ and $B_{RR}$. Moreover, it is possible to relatively reduce the amount of variation in volume of the pressure chamber 93 as a result of the advancing movement of the urging piston 78, thereby reducing the invalid stroke of the brake pedal 1, because the pressure receiving area $A_2$ of the urging piston 78 exposed to the pressure chamber 93 is smaller than the pressure receiving area $A_3$ of the input piston 94 exposed to the pressure chamber 93.

In the case, in the stroke accumulator 113, the fluid pressure in the pilot chamber 117 is abnormally reduced with a reduction in output fluid pressure from the fluid pressure supply source 3, causing the back-up piston 118 to be advanced or moved to the right in FIG. 6 to abut against the retainer 132, further bringing the retainer into abutment against the collar 134a of the piston rod 134, whereby the back-up spring 121, having the large spring load, acts on the accumulator piston 116. Therefore, when the fluid pressure supply source 3 has been abnormally reduced, the fluid pressure generated in the pressure chamber 93 cannot be unnecessarily consumed in the stroke accumulator 113, and the depression stroke of the brake pedal 1 cannot be unnecessarily increased.

Figure 7:
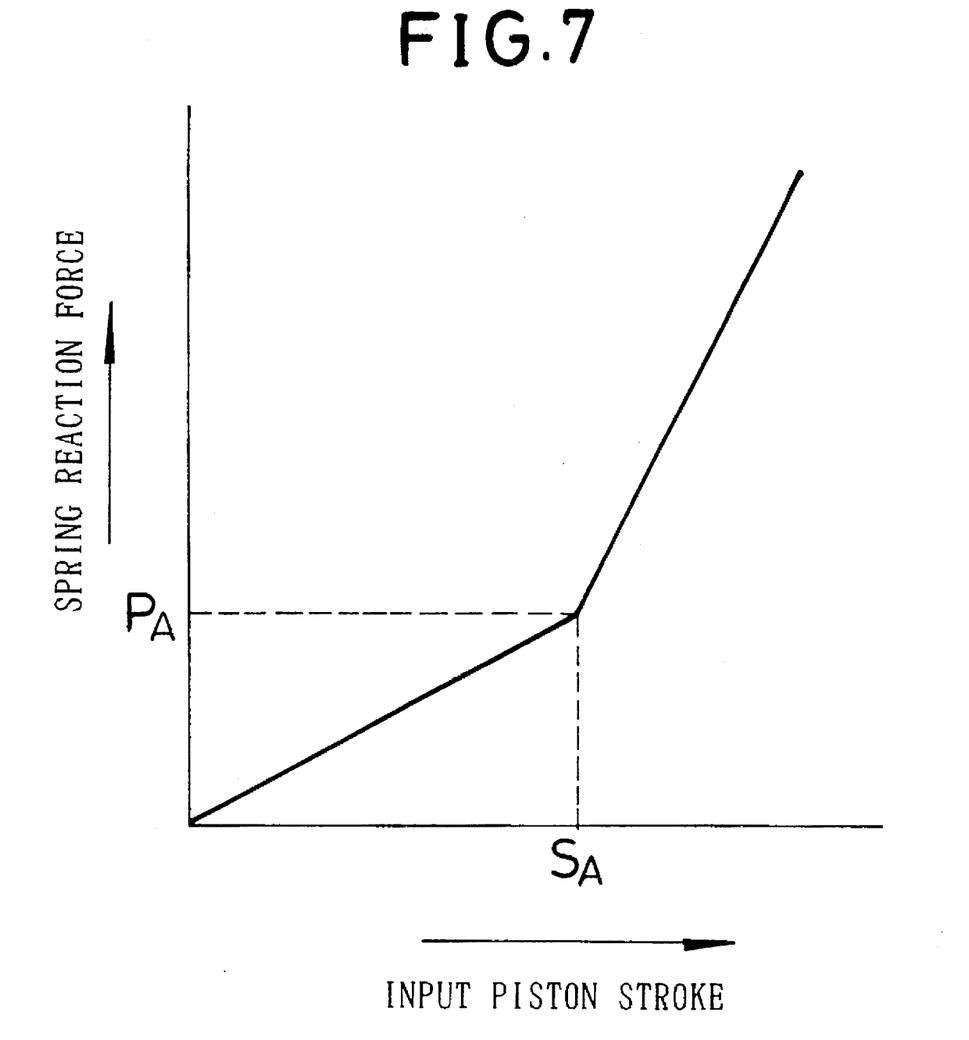
FIG. 7 is a graph illustrating the relationship between the stroke of an input piston in an auxiliary fluid pressure generating means and the spring reaction force.

The spring 95, having the large spring load, and the spring 96, having the small spring load, are interposed in series between the input piston 94 and the urging piston 78 in the auxiliary fluid pressure generating means 61 of the fluid pressure control device 2. For this reason, the spring reaction force on the stroke of the input piston 94 is as shown in FIG. 7. More specifically, the spring reaction force is increased slowly to a predetermined value $P_A$, from the start of the advancing movement of the input piston 94 until the input piston 94 reaches a stroke amount $S_A$. When the stroke of the input piston 94 exceeds the stroke amount $S_A$, the spring reaction force is increased rapidly. Such a spring reaction force characteristic ensures that, when any defect is produced in the fluid pressure system leading to the pressure chamber 93 in a condition in which the output pressure from the fluid pressure supply source 3 is normal, the increase in pedal stroke of the brake pedal 1 is suppressed to a level slightly exceeding the stroke amount $S_A$ by applying the relatively large spring reaction force to the input piston 94, and whereas, when the fluid pressure system leading to the pressure chamber 93 is normal and the output pressure from fluid pressure supply source 3 has been abnormally reduced, the increase in spring reaction force applied from the input piston 94 to the brake pedal 1 is suppressed to a level slightly exceeding the predetermined value $P_A$.

Further, when the driving force of the engine is too large during non-braking and as a result, the driving wheels are about to slip, the normally opened type and normally closed type traction control solenoid valves 8 and 9 are energized. This permits the output fluid pressure from the fluid pressure supply source 3 to be applied to the input fluid pressure chambers 19 in the fluid pressure transmitting units $4_{FL}$ and $4_{FR}$, causing the braking force to be generated in the brake devices $B_{FL}$ and $B_{FR}$ for the left and right wheels which are the driving wheels, thereby avoiding the generation of an excessive slipping. Thereafter, it is possible to control the braking force by controlling the energization and the deenergization of the inlet valves $6_{FL}$ and $6_{FR}$ and the outlet valves $7_{FL}$ and $7_{FR}$, as is the case with the above-described antilock control.

In such braking pressure control system, provided in the plug member 70 as one component of the fluid pressure control device 2 is the differential pressure regulating valve 85 for ensuring that no fluid pressure is applied to the reaction chamber 75, i.e., no operation reaction force is applied to the brake pedal 1 at the initial stage of the braking operation, until the fluid pressure delivered from the output port 81 in the fluid pressure control device 2 reaches the certain value. Therefore, the braking pressure control system can be of a compact construction.

A breathing action of the output fluid pressure chamber in each of the fluid pressure transmitting units $4_{FL}$, $4_{FR}$ and $4_R$ can be performed by the seal member 28 mounted around the outer periphery of the free piston 21, and a breathing action of the passage 24 leading to the valve chest 33, in each of the bypass valve 23, can be performed by the cup seals 137 and 138 mounted around the outer periphery of the accumulator piston 116 in the stroke accumulator 113. Therefore, one-way valves for producing the breathing actions can be unified with the free piston 21 and the accumulator piston 116, respectively, to provide a compact construction. Further, since the accumulator piston 116 is provided with the differential pressure valve 136 for ensuring that no fluid pressure in the pressure chamber 93 is applied to the bypass valve 23, until the pressure in pressure chamber 93 becomes equal to or more than the predetermined value, a further compact construction can be provided.

The present invention is widely applicable not only to a braking pressure control system for a vehicle in which the boosted braking pressure is applied to each of the brake devices $B_{FL}$, $B_{FR}$, $B_{RL}$ and $B_{RR}$ in response to the depressing operation of the brake pedal 1, but also to a fluid pressure control system in which the output pressure from the fluid pressure supply source, capable of delivering a given fluid pressure, can be controlled and delivered in accordance with the amount of operation of the operation member.

What is claimed is:

1. A fluid pressure control device comprising a housing having an input port connected to a fluid pressure supply source, an output port leading to a fluid pressure operated device and a release port connected to a reservoir; a sliding member slidably fitted in said housing between a retracted position, at which position said sliding member connects said output port with said release port, and an advanced position at which position said sliding member connects said output port with said input port; a reaction chamber in said housing and facing a front surface of said sliding member for generating a fluid pressure urging said sliding member in a retracting direction, said reaction chamber being connected to said output port; an urging piston slidably fitted in said housing and operatively connected to a rear end of said sliding member; an input piston slidably fitted in said housing and operatively connected to an operation member; and a pressure chamber formed between a back surface of said urging piston and a front surface of said input piston; wherein a pressure receiving area A1 of said sliding member, exposed to said reaction chamber, is set smaller than a pressure receiving area A2 of said urging piston, exposed to said pressure chamber, and said pressure receiving area A2 of said urging piston is set smaller than a pressure receiving area A3 of said input piston exposed to said pressure chamber, and wherein said pressure receiving areas A1, A2 and A3 are in such a relationship that A2/A1>A3/A2.

2. A fluid pressure control device according to claim 1 further comprising means for determining a maximum spacing between said urging piston and said input piston, means to establish fluid communication between said pressure chamber and said reservoir when said maximum spacing between said input piston and said urging piston is determined; and means for terminating fluid connection between said pressure chamber and said reservoir when said input piston deviates from its maximum spacing from said urging piston.

3. The fluid pressure control device according to claim 1, wherein said pressure chamber is connected to said fluid pressure operated device via a bypass closed in response to a rise in a pressure output from said output port.

4. A fluid pressure control device according to claim 1, wherein said urging piston is formed separate from said sliding member and operatively engages a rear end of sliding member; and a space is defined among said housing, said sliding member and a front surface of said urging piston, said space being connected to said reservoir.

5. The fluid pressure control device according to claim 4 wherein said housing comprises a large cylinder body and a small cylinder body fixedly received in said large cylinder body, said input piston being received in said large cylinder body, said small cylinder body being provided with a small slide bore and a larger slide bore coaxial with said small slide bore, said larger slide bore being disposed at a rear end of the small cylinder body, said sliding member being slided in said small slide bore and said urging piston being received in said larger slide bore.

6. The fluid pressure control device according to claim 5 wherein a first seal means is disposed between said large cylinder body and an outer periphery of said input piston, a second seal means is disposed between said larger slide bore and an outer periphery of said urging piston, said sliding member being received in said small slide bore with no seal means interposed therebetween.

7. The fluid pressure control device according to claim 4 wherein a first seal means is disposed between said housing and an outer periphery of said input piston and a second seal means is disposed between said housing and an outer periphery of said urging piston, said sliding member being received in said housing with no seal means interposed therebetween.

* * * * *